United States Patent [19]

Cavitt

[11] 4,404,335

[45] Sep. 13, 1983

[54] HYDROLYZING EPOXY RESINS IN ABSENCE OF SOLVENT AND IN PRESENCE OF OXALIC ACID AND A PHOSPHONIUM COMPOUND

[75] Inventor: Michael B. Cavitt, Lake Jackson, Tex.

[73] Assignee: The Dow Chemical Company, Midland, Mich.

[21] Appl. No.: 408,348

[22] Filed: Aug. 16, 1982

[51] Int. Cl.$^3$ ............................................. C08G 59/14
[52] U.S. Cl. ................................. 525/507; 525/523; 528/87; 528/403
[58] Field of Search .................. 525/507, 523; 528/87, 528/403

[56] References Cited

U.S. PATENT DOCUMENTS

| | | | |
|---|---|---|---|
| 3,405,093 | 10/1968 | Walker | 260/47 |
| 3,632,836 | 1/1972 | Walker | 260/830 R |
| 3,787,508 | 1/1974 | Walker | 260/613 R |
| 3,891,525 | 6/1975 | Irwin et al. | 204/181 |
| 3,991,028 | 11/1976 | Irwin et al. | 260/29.4 R |
| 4,145,324 | 3/1979 | Chen | 260/29.4 R |
| 4,340,713 | 7/1982 | Davis et al. | 528/89 |
| 4,358,577 | 11/1982 | McCrary et al. | 528/89 |

Primary Examiner—Earl A. Nielsen
Attorney, Agent, or Firm—J. G. Carter

[57] ABSTRACT

Epoxy resins are hydrolyzed in the absence of substantial quantities of an organic solvent and in the presence of oxalic acid and a phosphonium compound.

6 Claims, No Drawings

HYDROLYZING EPOXY RESINS IN ABSENCE OF SOLVENT AND IN PRESENCE OF OXALIC ACID AND A PHOSPHONIUM COMPOUND

BACKGROUND OF THE INVENTION

The present invention relates to a process for preparing hydrolyzed epoxy resins.

High molecular weight polyepoxide resins have been made more reactive by blending with a hydrolyzed or partially hydrolyzed low molecular weight or high molecular weight epoxy resin as disclosed by Walker in U.S. Pat. No. 3,632,836.

Hydrolyzed and partially hydrolyzed epoxy resins have been prepared by dissolving the epoxy resin to be hydrolyzed in an inert organic solvent, admixing the resultant solution with a dilute aqueous solution of an acid catalyst, heating to a temperature of from about 50° C. to about 374° C., washing to remove the acid catalyst and distilling the solvent to recover the hydrolyzed epoxy resin product. Such process is disclosed by Walker in U.S. Pat. Nos. 3,405,093, 3,632,826 and 3,787,508.

Such process requires the necessity for removing and recovering large quantities of an organic solvent therefrom. The present invention not only eliminates the need for removing large quantities of organic solvent, but reduces the time required to reach the desired level of hydrolysis.

SUMMARY OF THE INVENTION

The present invention pertains to an improvement in a process for hydrolyzing an epoxy resin in the absence of a polyhydric phenol and in the presence of a catalyst wherein the improvement resides in conducting the reaction in the absence of substantial quantities of an organic solvent and in the presence of catalytic quantities of a combination catalyst comprising
(1) at least one dicarboxylic acid, and
(2) at least one phosphonium compound and wherein components (1) and (2) are employed in a molar ratio of from about 1:1 to about 20:1, preferably from about 3:1 to about 10:1, most preferably from about 5:1 to about 7:1, respectively.

DETAILED DESCRIPTION OF THE INVENTION

Any epoxy resin of the glycidyl ether of a polyhydric aromatic or aliphatic compound type can be hydrolyzed by the process of the present invention. Such resins are fully described in *Handbook of Epoxy Resins* by Lee and Neville, McGraw-Hill, 1967 which is incorporated herein by reference. Particularly suitable epoxy resins which can be hydrolyzed by the process of the present invention include the glycidyl ethers of bisphenols and novolac resins.

Suitable dicarboxylic acids which can be employed herein include those having from 2 to about 10, preferably from about 2 to about 6, most preferably from about 2 to about 4, carbon atoms, such as, for example, oxalic acid, malonic acid, succinic acid, glutaric acid, adipic acid, pimelic acid, suberic acid, azelaic acid, sebacic acid, mixtures thereof and the like.

Also suitable are the hydrates of the aforementioned acids.

Suitable phosphonium catalysts which can be employed with the dicarboxylic acid in the present invention for hydrolyzing epoxy resins include, for example, those disclosed by Perry in U.S. 3,948,855 or by Dante in U.S. Pat. No. 3,477,990 which are incorporated herein by reference. Particularly suitable phosphonium catalysts include, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid comples), tetrabutylphosphonium chloride, tetrabutylphosphonium bromide, tetrabutylphosphonium iodide, tetrabutylphosphonium acetate and tetrabutylphosphonium diacetate (tetrabutylphosphonium acetate.acetic acid complex). The total quantity of catalyst varies from time to time, depending upon the conditions employed, but is usually from about 0.001 to about 0.01, preferably from about 0.003 to about 0.008 moles of total catalyst per epoxide equivalent contained in the resin or resins to be hydrolyzed. Higher quantities can be employed, but no beneficial results are obtained.

The process of the present invention is conducted at temperatures of from about 50° C. to about 200° C., preferably from about 110° C. to about 150° C. for a period of time to reach the desired degree of hydrolysis.

The amount of water employed is dependent upon the desired degree of hydrolysis, but usually from about 0 to about 100, preferably from about 0 to about 30, most preferably from about 0 to about 5 percent in excess of the theoretical amount of water required for hydrolysis is employed.

The following examples are illustrative of the invention, but are not to be construed as to limiting the scope thereof in any manner.

The following components were employed in the examples.

CATALYST A is a 70 weight % solution of ethyltriphenyl phosphonium acetate.acetic acid complex in methanol.

CATALYST B is oxalic acid.2H$_2$O.

EPOXY RESIN A is a diglycidyl ether of bisphenol A having an average epoxide equivalent weight (EEW) of about 241.

EPOXY RESIN B is a phenol-formaldehyde epoxy novolac resin having an average epoxide functionality of about 3.6 and an average EEW of about 181.

EPOXY RESIN C is a cresol-formaldehyde epoxy novolac resin having an average epoxide functionality of about 5.7 and an average EEW of about 228.

EPOXY RESIN D is a phenol-formaldehyde epoxy novolac resin having an average epoxide functionality of about 2.2 and an average EEW of about 180.

EPOXY RESIN E is the triglycidyl ether of tris(4-hydroxyphenyl)methane having an average EEW of about 171.

CURING AGENT A is a reaction product of a polyfunctional carboxylic acid and a polyalkylenepolyamine with an amine hydrogen equivalent weight of about 170 commercially available from Henkel Corp. as VERSAMID 115.

CURING AGENT B is a polyalkylenepolyamine with an amine hydrogen equivalent weight of about 24.4.

The following components were employed to evaluate coating performance on cold rolled steel panels using the resin examples.

COATING FORMULATION A was made up of two parts. Part 1 contained the resin and Part 2 contained the curing agent. Part 1 and 2 were mixed and given an induction time of one hour (3600 s) at 25° C. At the end of one hour (3600 s), the coating was made. Part 1 was composed of 100 parts resin, 72 parts methyl isobutyl ketone, 37 parts of the methyl ether of propylene glycol and 1.7 parts of a urea-formaldehyde resin that is 60% N.V. in butanol and xylol. Part 2 was composed of 120 parts xylene and 80 parts of curing agent A. All parts were based on mass. This formulation was used to coat steel panels and they were allowed to cure at ambient temperature for 7 days (604,800 s).

COATING FORMULATION B was made up of 100 parts resin, 109 parts of methyl ethyl ketone, 1.7 parts of a urea-formaldehyde resin that is 60% N.V. in butanol and xylol and a stoichiometric amount of curing agent B. All parts were based on mass. When all parts were mixed together, a coating was prepared and allowed to cure at ambient temperature for 7 days (604,800 s).

Coatings made from the epoxy resins were evaluated by the following tests.

MEK DOUBLE RUBS

To the ball end of a 2 lb. ball pein hammer was attached a pad of cheese cloth composed of 8 plys. The pad was saturated with methyl ethyl ketone (MEK) and then rubbed across a coated substrate. A constant back and forth motion is used allowing only the weight of the hammer to apply force on the coating. A back and forth movement counts as one double rub. This motion is continued until the coating is mared and/or begins to be removed by the solvent effect.

Pencil Hardness

This procedure can be found in *Paint Testing Manual* by H. A. Gardner and G. C. Sward in the 12th edition (1962) pages 131 and 132. One part was modified. When the coating is broken to the metal surface, that constitutes a failure. The results reported here are a pencil hardness that does not break the film but the next harder pencil grade does break film.

Glacial Acetic Acid Spot Test

A coating that has been applied to a substrate and cured such as cold rolled steel can be tested for chemical resistance. In this test glacial acetic acid ($\simeq 1$ ml) is placed on the coating. A timer is started. When the coating delaminates from the substrate, failure has occurred and the timer stopped. This time that has been rocorded is then called time to failure for glacial acetic acid.

EXAMPLE 1

A 2 liter pressure reactor was charged in order, with 700 g (2.902 epoxy equivalents) of epoxy resin A, 1.18 g (0.002 mole) of catalyst A, 16.85 g (0.936 mole) of water and 1.4 g (0.011 moles) of catalyst B. The reactor was sealed, purged with nitrogen and left with a 20 psig (137.9 kPa) of nitrogen. The contents were heated to 134° C. in 0.58 hour (2088 s) and maintained at 135° C. for 2 hours (7200 s). The reactor was then heated to 189° C. and the temperature maintained at about 190° C. under a vacuum for about 1 hour (3600 s). The resultant product had 18% of the epoxy groups hydrolyzed.

Comparative Experiment A

A 2 liter pressure reactor was charged in order, with 700 g (2.902 epoxy equivalents) of epoxy resin A, 7.67 g (0.013 mole) of catalyst A, 12.23 g (0.679 mole) of water. The reactor was sealed, purged with nitrogen and left with a 20 psig (137.9 kPa) of nitrogen. The contents were heated to 132° C. in 0.58 hour (2088 s) and maintained at 136° C. for 1 hour (3600 s). The reactor was then heated to 186° C. and the temperature maintained at about 190° C. under a vacuum for about 0.55 hour (1980 s). The resultant product had essentially none of the epoxy groups hydrolyzed.

Comparative Experiment B

A 2 liter pressure reactor was charged in order, with 1000 g (4.145 epoxy equivalents) of epoxy resin A, 16.93 g (0.941 mole) of water and 2.0 g (0.016 mole) of catalyst B. The reactor was sealed, purged with nitrogen and left with a 20 psig (137.9 kPa) of nitrogen. The contents were heated to 134° C. in 0.93 hour (3348 s) and maintained at 134° C. for 1.48 hour (5328 s). The reactor was then heated to 165° C. and the temperature maintained at about 163° C. under a vacuum for about 0.82 hour (2952 s). The resultant product had essentially none of the epoxy groups hydrolyzed.

EXAMPLE 2

A 2 liter pressure reactor was charged in order, with 700 g (3.888 epoxy equivalents) of epoxy resin B, 1.30 g (0.002 mole) of catalyst A, 9.60 g (0.533 mole) of water and 2 g (0.016 mole) of catalyst B. The reactor was sealed, purged with nitrogen and left wth a 24 psig (165.5 kPa) of nitrogen. The contents were heated to 134° C. in 0.57 hour (2052 s) and maintained at 140° C. for 1.02 hour (36872 s). The reactor was then heated to 190° C. and the temperature maintained at about 190° C. under a vacuum for about 0.5 hour (1800 s). The resultant product had 12% of the epoxy groups hydrolyzed.

Comparative Experiment C

A 2 liter pressure reactor was charged in order, with 431 g (2.385 epoxy equivalents) of epoxy resin B, 6.42 g (0.011 mole) of catalyst A, 6.19 g (0.344 mole) of water. The reactor was sealed, purged with nitrogen and left with a 20 psig (137.9 kPa) of nitrogen. The contents were heated to 135° C. in 0.53 hour (1908 s) and maintained at 139° C. for 1 hour (3600 s). The reactor was then heated to 190° C. and the temperature maintained at about 190° C. under a vacuum for about 0.52 hour (1872 s). The resultant product had essentially none of the epoxy groups hydrolyzed.

Comparative Experiment D

A 2 liter pressure reactor was charged in order, with 863 g (4.775 epoxy equivalents) of epoxy resin B, 11.6 g (0.644 mole) of water and 2.76 g (0.022 mole) of catalyst B. The reactor was sealed, purged with nitrogen and left with a 22 psig (151.7 kPa) of nitrogen. The contents were heated to 132° C. in 0.6 hour (2160 s) and maintained at 133° C. for 1 hour (3600 s). The reactor was then heated to 190° C. and the temperature maintained at about 192° under a vacuum for about 0.58 hour (2088 s). The resultant product had essentially none of the epoxy groups hydrolyzed.

EXAMPLE 3

A 2 liter pressure reactor was charged in order, with 485 g (2.126 epoxy equivalents) of epoxy resin C, 0.81 g (0.001 mole) of catalyst A, 5.61 g (0.312 mole) of water and 1.10 g (0.009 mole) of catalyst B. The reactor was sealed, purged with nitrogen and left with a 20 psig (137.9 kPa) of nitrogen. The contents were heated to 133° C. in 0.72 hour (2592 s) and maintained at 133° C. for 1.5 hour (5400 s). The reactor was then heated to 180° C. and the temperature maintained at about 185° C. under a vacuum for about 0.33 hour (1188 s). The resultant product had about 11% of the epoxy groups hydrolyzed.

EXAMPLE 4

A 2 liter pressure reactor was charged in order, with 1000 g (5.563 epoxy equivalents) of epoxy resin D, 2.01 g (0.003 mole) of catalyst A, 9.8 g (0.544 mole) of water and 2.8 g (0.022 mole) of catalyst B. The reactor was sealed, purged with nitrogen and left with a 20 psig (137.9 kPa) of nitrogen. The contents were heated to 134° C. in 1 hour (3600 s) and maintained at 132° C. for 1.38 hour (4968 s). The reactor was then heated to 170° C. and the temperature maintained at about 180° C. under a vacuum for about 0.5 hour (1800 s). The resultant product had about 11% of the epoxy groups hydrolyzed.

EXAMPLE 5

A 2 liter pressure reactor was charged in order, with 600 g (3.519 epoxy equivalents) of epoxy resin E, 1.44 g (0.005 mole) of catalyst A, 22.17 g (1.232 mole) of water and 2.66 g (0.021 mole) of catalyst B. The reactor was sealed, purged with nitrogen and left with a 20 psig (137.9 kPa) of nitrogen. The contents were heated to 150° C. in 0.6 hour (2160 s) and maintained at 152° C. for 1.8 hour (6480 s). The reactor was then heated to 185° C. and the temperature maintained at about 185° C. under a vacuum for about 0.17 hour (612 s). The resultant product had about 38% of the epoxy groups hydrolyzed.

Coatings were prepared from some of the hydrolyzed epoxy resins prepared by the process of the present invention and in some instances compared to unhydrolyzed epoxy resins. The results are given in the following Table.

| EXAMPLE OR COMPARATIVE EXPERIMENT NUMBER | Example 6 | Example 7 |
|---|---|---|
| EPOXY RESIN | Ex. 2 | Ex. 2 |
| FORMULATION | A | B |
| PENCIL HARDNESS[1] | H | F |
| MEK DOUBLE RUBS | >200 | >200 |
| GLACIAL ACETIC ACID SPOT TEST, seconds | 360 | N.D.[2] |

[1]The values going from poorest to best are: 6B, 5B, 4B, 3B, 2B, B, HB, F, H, 2H, 3H, 4H, 5H, and 6H.
[2]N.D. = not determined.

I claim:

1. In a process for hydrolyzing epoxy resins by reacting one or more of said epoxy resins with water in the presence of a catalyst; the improvement which comprises conducting the reaction in the absence of substantial quantities of an organic solvent and in the presence of a catalytic quantity of a catalyst consisting essentially of (1) one or more dicarboxylic acids having from 2 to about 10 carbon atoms and (2) one or more phosphonium compounds wherein the molar ratio of (1) to (2) is from about 1:1 to about 20:1 respectively.

2. A proces of claim 1 wherein component (1) has from 2 to about 6 carbon atoms; components (1) and (2) are present in quantities which provides a mole ratio of (1) to (2) of from about 3:1 to about 10:1; the total quantity of catalyst is from about 0.001 to about 0.01 moles of catalyst per epoxide equivalent and the reaction temperature is from about 50° C. to about 200° C.

3. A process of claim 2 wherein component (1) has from 2 to about 4 carbon atoms; the total quantity of catalyst is from about 0.003 to about 0.008 moles of catalyst per epoxide equivalent and the reaction temperature is from about 110° C. to about 150° C.

4. A process of claims 1, 2 or 3 wherein said epoxy resin is a glycidyl ether of a polyhydric phenol, a glycidyl ether of a phenol-formaldehyde novolac resin, a glycidyl ether of a cresol-formaldehyde novolac resin, a triglycidyl ether of tris(4-hydroxyphenyl)methane or mixture thereof.

5. A process of claim 4 wherein said phosphonium compound is a phosphonium carboxylate.carboxylic acid complex and said dicarboxylic acid is oxalic acid or a hydrate thereof.

6. A process of claim 5 wherein said phosphonium compound is ethyltriphenylphosphonium acetate.acetic acid complex.

* * * * *